United States Patent Office 3,833,681
Patented Sept. 3, 1974

3,833,681
POLYIMIDOSILOXANE ESTER CARBONATE COPOLYMERS
Fred F. Holub, Schenectady, and Denis R. Pauze, Scotia, N.Y., and Charles A. Bialous, Evansville, Ind., assignors to General Electric Company
No Drawing. Filed June 29, 1972, Ser. No. 267,360
Int. Cl. C08g 31/06
U.S. Cl. 260—824 R    7 Claims

ABSTRACT OF THE DISCLOSURE

Polyimidosiloxane ester carbonate copolymers are prepared by reacting a carbonyl halide or other carbonate precursor with a mixture of a bis(carboxyphthalimide), organopolysiloxane having hydroxy or carboxy functional terminal groups and a dihydroxy aromatic compound. The novel copolymers are particularly useful as electrical insulation, molding compounds, and tough flexible coatings and films.

The present invention relates to polycarbonates having imide radicals which impart stiffness, flame resistance, and temperature stability and siloxane radicals which impart corona resistance and good transport of gaseous oxygen and water vapor. These polyimidosiloxane ester carbonate copolymers are useful as electrical insulation, molding compounds, tough flexible coatings and films.

In accordance with the present invention, we have discovered polyimidosiloxane ester copolymers comprising the reaction product of (a) a bis(carboxyphthalimide) having the general formula:

I.
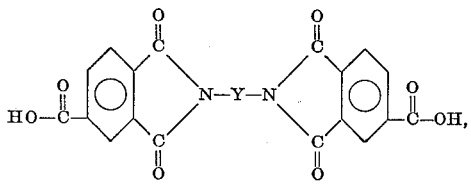

wherein Y is a divalent organic radical containing at least 2 carbon atoms,
(b) an organopolysiloxane having the general formula:

II.                QE$_2$, wherein Q is a repeating siloxane unit of the formula:

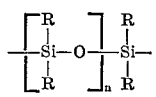

wherein R is lower alkyl and $n$ is an integer having a value of 1–100 or more and E is a member selected from the group consisting of:

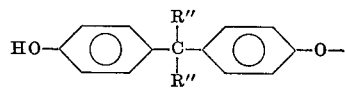

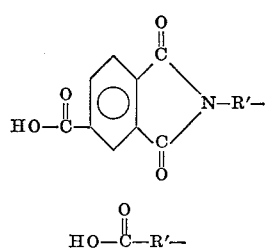

and mixtures thereof, wherein R' is lower alkyl and R" is lower alkyl or hydrogen, (c) a dihydroxy aromatic compound having the general formula:

III.                HO—Z—OH, wherein Z is a divalent aromatic hydrocarbon radical of from 6–20 carbon atoms, and
(d) a carbonyl halide or other carbonate precursor.

In the dihydroxy aromatic compounds of formula III, Z may represent a divalent aromatic hydrocarbon radical of from 6 to 20 carbon atoms, such as phenylene, biphenylene, naphthylene, etc. Included are residues of, e.g., hydroquinone, resorcinol, chlorohydroquinone, etc. In addition, Z may be a residue of a dihydroxy diarylene compound in which the aryl nuclei are joined by either an aliphatic group [e.g. =CH$_2$, =C(CH$_3$)$_2$,

=C(CH$_3$)(C$_2$H$_4$COOR)], sulfoxide, sulfonyl, sulfur, carbonyl, oxygen, etc. Typical of such diarylene compounds are the following:

2,4'-dihydroxydiphenylmethane;
bis(2-hydroxyphenyl)methane;
2,2-bis(4-hydroxyphenyl)propane hereinafter identified as "Bisphenol-A" or "BPA";
2,2-bis(4-hydroxy-2,6-dichlorophenyl)propane;
2,2-bis(4-hydroxy-2,6-dibromophenyl)propane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
2,2-bis(4-hydroxyphenyl)pentane;
3,3-bis(4-hydroxyphenyl)pentane;
2,2-bis(4-hydroxyphenyl)heptane;
bis(4-hydroxyphenyl)phenylmethane;
bis(4-hydroxyphenyl)-cyclohexylmethane;
1,2-bis(4-hydroxyphenyl)-1,2-bis(phenyl)propane;
2,2-bis(4-hydroxyphenyl)-1-phenylpropane;
2,4-dihydroxybenzophenone;
4,4'-dihydroxydiphenyl sulfone;
2,4'-dihydroxydiphenyl sulfone;
5'-chloro-2,4'-dihydroxydiphenyl sulfone;
3'-chloro-4,4'-dihydroxydiphenyl sulfone;
4,4'-dihydroxytriphenyl disulfone;
4,4'-dihydroxydiphenyl ether;
4,4'-dihydroxydiphenyl sulfide;
4,4'-dihydroxy-o-biphenyl ether;
the 4,3'-, 4,2'-, 4,1'-, 2,2'-, 2,3'-, etc. dihydroxydiphenyl ethers;
4,4'-dihydroxybenzophenone;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
2-methyl-2-carboxyethyl-bis(4-hydroxyphenyl)propane;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxy-diphenyl ether;

etc., dihydric phenols substituted on the aryl nucleus with alkyl, alkenyl, cycloaliphatic, cycloalkenyl, aryl, alkaryl, numerous examples of which have been given above, as well as the dihydroxy toluenes, the dihydroxy xylenes, dihydroxy pyridines, dihydroxy anthraquinones, dihydroxy benzoic acids, other dihydroxy benzophenones, etc.

The Z radical can have many inert substituents on the aryl nuclei as recited above, for instance, halogens such as chlorine and bromine; monovalent hydrocarbon radicals such as methyl, ethyl, cycloaliphatic radicals (for instance, cyclopentyl, cyclohexyl etc.), etc.; aryl radicals, e.g., phenyl, biphenyl, etc., radicals; alkaryl radicals, e.g., tolyl, ethylphenyl, etc., radicals; aralkyl radicals, e.g., benzyl, phenylethyl, etc., radicals.

The bis(carboxyphthalimide) of formula I used in preparing the copolymer is prepared by reacting a diamine of the formula:

IV. 

wherein Y is a divalent organic radical containing at least 2 carbon atoms with trimellitic anhydride of the formula:

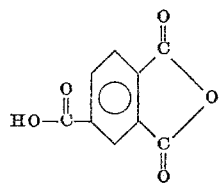

The molar ratio of diamine to trimellitic anhydride should ideally be about 1:2 respectively. The initial reaction product is a bis(amide-acid) which is subsequently dehydrated to the corresponding bis(carboxyphthalimide).

The diamines of formula IV above are described in the prior art and are to a large extent commercially available materials. Typical of such diamines from which the bis(nitrophthalimides) may be prepared are the following:

m-phenylenediamine;
p-phenylenediamine;
4,4′-diaminodiphenylpropane;
4,4′-diaminodiphenylmethane;
benzidine;
4,4′-diaminodiphenyl sulfide;
4,4′-diaminodiphenyl sulfone;
4,4′-diaminodiphenyl ether;
1,5-diaminonaphthalene;
3,3′-dimethylbenzidine;
3,3′-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;

and mixtures thereof. It should be noted that these diamines are given merely for the purpose of illustration and are not considered to be all inclusive. Other diamines not mentioned will readily be apparent to those skilled in the art.

The organopolysiloxanes of formula II have repeating siloxane units represented by the symbol Q of the formula:

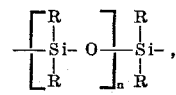

wherein R is lower alkyl and $n$ is an integer having a value of 1–100 or more. In order to form the novel polymers of the present invention, the organopolysiloxanes must be terminated with either hydroxy or carboxy groups. Radicals containing these groups are represented by the symbol E which is a member selected from the group consisting of:

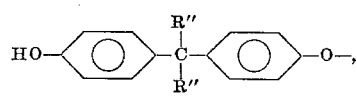

wherein R″ is lower alkyl or hydrogen;

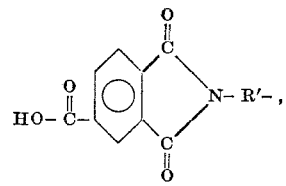

wherein R′ is lower alkyl;

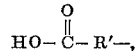

wherein R′ is as set forth above, and mixtures thereof.
Typical organopolysiloxanes are as follows:

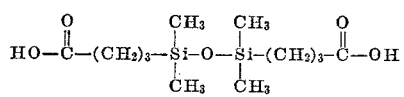

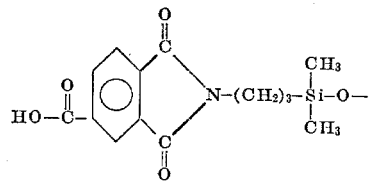

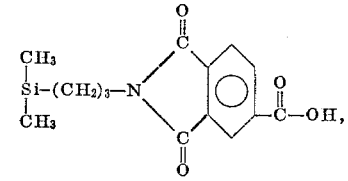

and

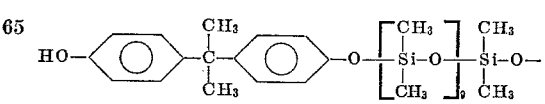

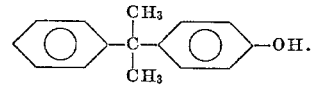

The carbonyl halide employed in the practice of the invention can be carbonyl chloride, carbonyl bromide or carbonyl fluoride. Preferably, phosgene is used since it is very reactive and by-products are easily discarded as the salts.

The novel polyimidosiloxane ester carbonate copolymer can be prepared by reacting a mixture of the bis(carboxyphthalimide) of formula I, an organopolysiloxane of formula II, and a dihydroxy aromatic compound of formula III, with the carbonyl halide in the presence of a suitable catalyst, e.g., a tertiary amine and a suitable acid acceptor, e.g., calcium hydroxide. An organic solvent can be employed with the aforementioned reactants to facilitate the polymer formation. Suitable organic solvents include any organic solvents which are inert to the reactants under the conditions of the reaction and are illustrated by methylene chloride, ethylene dichloride, pyridine, etc. During phosgenation, the mixture is continuously agitated.

Proportions of the reactants may vary over a wide range depending upon the properties desired in the resultant copolymer, i.e., the siloxane groups impart corona resistance and good transport of gaseous oxygen and water vapor for membrane applications, while the imide groups impart stiffness for rigidity of molding compounds, flame resistance and heat stability. The reactants are added in such proportions that the minimum amount of the functional groups in the copolymer are 0.5 mole percent of siloxane, 10 mole percent of imide and 10 mole percent of polycarbonate. The preferred ranges are 5–60 mole percent of siloxane, 10–50 mole percent of imide and 30–85 mole percent of polycarbonate.

The termination of the phosgenation reaction can be determined when the mixture reaches its maximum temperature exotherm and then begins to drop. Recovery of the copolymer can be achieved by adding the mixture to an aliphatic alcohol, such as methanol. The final product can be recovered by standard techniques and stripped of solvent.

Fillers, pigments, flame retardants, and dyes may be added to the copolymer of the present invention. The fillers may be in the form of particles or fibers. Typical fillers include ground ceramics, glass, silica, quartz, mica, treated clays, titanium dioxide, boron nitride, graphite, carbon black, glass fibers, asbestos fibers, and metal powders such as iron powder, copper powder or aluminum powder. The amount of filler used depends on the particular properties of the composition desired. Filler in amounts of up to about 300 percent by weight of the polymer composition may be used.

In order that those skilled in the art may better understand how the present invention may be practiced, the following examples are given by way of illustration and not by way of limitation.

EXAMPLE I

A one liter flask fitted with a thermometer, Vigreaux column and a phosgene inlet tube was charged with 40.0 g. (0.175 mole) of Bisphenol-A, 20.7 g. (0.038 mole) of 4,4'-bis(4-carboxyphthalimido)diphenylmethane (hereinafter referred to as the "diacid-diimide"), 11.6 g. (0.038 mole) of bis(carboxypropyl)tetramethyldisiloxane, 74 g. of calcium hydroxide, 500 ml. of ethylene dichloride, and 35μ liters of triethylamine added as a catalyst. The mixture was stirred and the phosgene added slowly. Phosgenation was continued until the mixture was very viscous.

The solution was then diluted and filtered using a filtering aid. The filtrate was slowly poured with vigorous stirring into a large quantity of methanol. The resulting solid was filtered, washed with methanol and dried in vacuo at room temperature. The polymer softened at about 280° C. A tough flexible film of the polymer was obtained by casting from an ethylene dichloride solution on a glass plate and drying at 100° C. for one hour.

EXAMPLE II

Following the procedure of Example I, a 250 ml. flask fitted with a thermometer, stirrer, phosgene inlet and condenser with nitrogen adapter was charged with 6.1 g. (0.02 m.) of bis(carboxypropyl)tetramethyldisiloxane, 10.9 g. (0.02 m.) of the diacid-diimide, and 170 ml. of pyridine. The phosgene was slowly added for ½ hour with constant stirring. After the solution was cooled to room temperature, 13.7 g. (0.06 m.) of Bisphenol-A were added and the phosgenation continued until the solution gelled. Then 50 ml. of methylene chloride was added and phosgenation continued until the temperature decreased.

The solution was cooled to room temperature and 15 ml. of 28% of hydrochloric acid was slowly added together with 50 ml. of methylene chloride. The solution was precipitated from methanol and the precipitate was filtered and washed with methanol. The polymer was redissolved in methylene chloride and reprecipitated with methanol. Then it was filtered, washed and dried overnight in vacuo at 70° C. The yield was 25.9 g. (80% of theoretical) and the flow temperature was found to be 225–230° C. A film was cast and cured by heating to temperatures of up to 200° C. The resulting cured film was clear, yellowish and very flexible.

EXAMPLE III

Following the procedure and using the apparatus of Example II, the reactor was charged with 6.1. g. (0.02 m.) of bis(carboxypropyl) tetramethyldisiloxane, 5.5 g. (0.01 m.) of the diacid-diimide and 170 ml. of pyridine. The mixture was stirred and phosgene slowly added. Then 15.9 g. (0.07 m.) of Bisphenol-A was added and the phosgenation continued until the temperature started to decrease. After being neutralized with hydrochloric acid and dissolved in methylene chloride, the polymer was percipitated with methanol.

The polymer was redissolved, reprecipitated and dried overnight in vacuo at 70° C. The yield was 23.7 g. (83%) and the flow temperature was 170–180° C. A film was cast and cured at temperatures up to 200° C. to produce a product which was clear, slightly yellow and very flexible.

EXAMPLE IV

Following the procedure and using the apparatus of Example II, the reactor was charged with 6.1 g. (0.02 m.) of bis(carboxypropyl)tetramethyldisiloxane, 8.2 g. (0.015 m.) of the diacid-diimide and 170 ml. pyridine. The mixture was stirred and phosgene was added. Then 14.8 g. (0.065 m.) of Bisphenol-A was added and phosgenation was continued. After precipitating and washing, the polymer was dried at 70° C. in vacuo overnight. The yield was 25.2 g. (82%) and the flow temperature was 220–230° C. The resulting cast and cured film was clear, slightly yellowish and very flexible.

EXAMPLE V

Following the procedure and using the apparatus of Example II, the reactor was charged with 6.1 g. (0.02 m.) of bis(carboxypropyl)tetramethyldisiloxane, 13.6 g. (0.025 m.) of the diacid-diimide and 170 ml. of pyridine. The mixture was stirred and phosgene was added. Then 12.5 g. (0.055 m.) of Bisphenol-A was added and phosgenation was continued. After precipitating and washing, the polymer was dried in vacuo at 70° C. overnight. The resulting polymer exhibited a flow temperature of 220–230° C. The cast and cured film was very flexible, clear and brownish in color.

EXAMPLE VI

Following the procedure and using the apparatus of Example II, the reactor was charged with 3.1 g. (0.01 m.) of bis(carboxypropyl)tetramethyldisiloxane, 5.5 g. (0.01 m.) of the diacid-diimide, 20 ml. of pyridine and 140 ml. of ethylene dichloride. Phosgene was added with stirring and then 18.2 g. (0.08 m.) of Bisphenol-A was added and the phosgenation continued. After precipitation and washing, the polymer was dried in vacuo at 70° C. overnight. The yield was 23.1 g. (80%) and flowed at 180–190°

C. A film was cast and cured to yield a flexible and slightly cloudy film.

EXAMPLE VII

Following the procedure of Example I, the reactor was charged with 400 ml. of ethylene dichloride, 35μ liter of triethylamine, 74 g. calcium hydroxide, 14.33 g. of an 18% solution (2.58 g. solids) of a siloxane having the average formula:

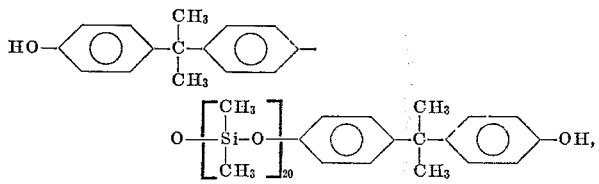

31.35 g. of Bisphenol-A, and 58.6 g. of the diacid-diimide. The contents were stirred and slowly phosgenated for two hours during which the temperature rose of 51° C. The viscous slurry was diluted with ethylene dichloride and filtered. The solution was precipitated by slow addition to methanol with vigorous stirring. The precipitate was filtered, washed with methanol and dried in vacuo at 100° C. at 15 mm. Hg for four hours. A white powder was obtained.

A film was prepared by dissolving the polymer in ethylene dichloride to form a 9% solids solution. The film was cast on a glass substrate and heated to temperatures up to 200° C. A clear tough flexible film was obtained. Also, a clear flexible film was pressed at 250° C. at 5000 p.s.i. gauge pressure. The intrinsic viscosity of the polymer was 0.44 in NMP at 25° C. Elemental analysis gave values of 71.8% carbon, 5.0% hydrogen, 1.7% nitrogen and 2.0% silicon.

EXAMPLE VIII

Following the procedure of Example I, the reactor was charged with 13.7 g. of the diacid-diimide, 48.50 g. of Bisphenol-A, 7.80 g. of a siloxane having the formula:

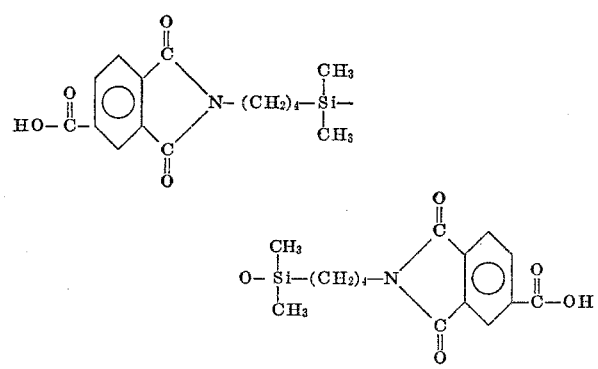

74 g. of calcium hydroxide, 35 μl. triethylamine and 500 ml. ethylene dichloride. Phosgene was slowly introduced into the mixture and was continued until a viscous slurry was obtained. An additional 600 ml. of ethylene dichloride was added along with 100 ml. water. The slurry was filtered and the clear solution was added to a blender containing methanol. The precipitate was filtered, washed with methanol and air dried.

A portion of the polymer was added to ethylene dichloride and a film was cast on a glass substrate. The film was air dried and then dried at 150° C. for one hour. A clear flexible tough film was obtained which was difficult to remove from the substrate.

EXAMPLE IX

Following the procedure of Example I, the reactor was charged with the following:

| | Amount | Mole percent |
|---|---|---|
| Dihydroxydiphenyl sulfone | 12.5 g. | 50 |
| Diacid-diimide dichloride [a] | 24.6 g. | 40 |
| $D_{10}$ siloxane solution [b] | 23.6 ml. | 10 |
| Triethylamine | 35 μl. | |
| Calcium hydroxide | 75 g. | |
| Ethylene dichloride | 400 ml. | |

[a] Imidized reaction product of two equivalents of trimellitic anhydride and one equivalent of bis(3-chloro-4-aminophenyl)methane.
[b] Solution of Bisphenol-A end terminated $D_{10}$ siloxane, in an excess of Bisphenol-A containing $4.2\times10^{-4}$ moles of siloxane per ml.

The phosgene was slowly added for a period of two hours during which the temperature rose to 43° C. An additional 100 ml. ethylene dichloride was added to the flask and the contents filtered. A portion of the clear solution was coated on a glass substrate and heated to 250° C. A smooth, clear, colorless, flexible film was obtained.

EXAMPLE X

Following the procedure of Example IX, the reactor was charged with the following:

| | Amount | Mole percent |
|---|---|---|
| Bisphenol-A | 10.3 g. | 45 |
| Diacid-diimide | 21.8 g. | 40 |
| Siloxane of Ex. VIII | 3.1 g. | 5 |
| Tetrabromo-Bisphenol-A | 5.4 g. | 10 |
| Triethylamine | 35 μl. | |
| Ethylene dichloride | 400 ml. | |
| Calcium hydroxide | 74 g. | |

Phosgene was slowly added over a 2.5 period with an exotherm of about 28° C. noted. The contents were filtered and a portion of the clear solution was coated on a glass plate and heated to a temperature of 250° C. A smooth, clear, flexible film was obtained.

EXAMPLE XI

Following the procedure of Example IX, the reactor was charged as follows:

| | Amount | Mole percent |
|---|---|---|
| Bisphenol-A | 10.3 g. | 45 |
| Diacid-diimide | 5.5 g. | 10 |
| Siloxane of Ex. VIII | 3.1 g. | 5 |
| Tetrabromo-Bisphenol-A | 21.7 g. | 40 |
| Triethylamine | 35 μl. | |
| Ethylene dichloride | 400 ml. | |
| Calcium hydroxide | 74 g. | |

Phosgene was added slowly over a period of one hour with an approximate 30° C. exotherm noted. The contents were filtered and a portion of the clear liquid was coated on a glass plate and heated to a temperature of 250° C. A smooth, clear, flexible film was obtained.

EXAMPLE XII

Following the procedure of Example IX, the reactor was charged as follows:

| | Amount | Mole percent |
|---|---|---|
| Bisphenol-A | 13.7 g. | 60 |
| Siloxane of Ex. VIII | 6.2 g. | 10 |
| Bisphenol-imide [c] | 16.2 g. | 30 |
| Calcium hydroxide | 70 g. | |
| Triethylamine | 0.1 g. | |
| Ethylene dichloride | 400 ml. | |

[c] Imidized reaction product of two equivalents of p-aminophenol and one equivalent of benzophenone tetracarboxylic dianhydride.

Phosgene was slowly added to the mixture for a period of two hours, during which the temperature rose to 43° C. An additional 100 ml. ethylene dichloride was added and the contents filtered. A portion of the clear liquid was coated on a glass plate and heated to 250° C. A smooth, clear, colorless, flexible film was obtained.

It will be appreciated that the invention is not limited to the specific details shown in the examples and illustrations and that various modifications may be made within the ordinary skill in the art without departing from the spirit and scope of the invention.

We claim:

1. A polyimidosiloxane ester carbonate polymer consisting essentially of the reaction product of:
    (a) a bis(carboxyphthalimide) having the general formula:

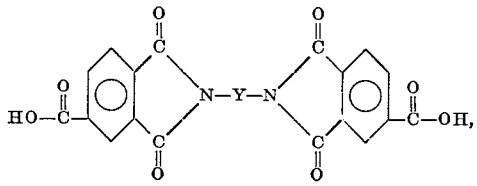

wherein Y is a divalent organic radical containing at least two carbon atoms,
    (b) an organopolysiloxane having the general formula:

wherein Q is a repeating siloxane unit of the formula:

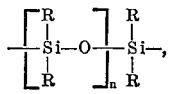

wherein R is lower alkyl and $n$ is an integer having a value of 1–100 or more and E is a member selected from the group consisting of:

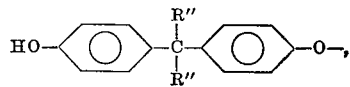

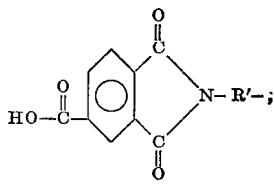

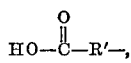

and mixtures thereof, wherein R' is lower alkyl and R'' is lower alkyl or hydrogen,
    (c) a dihydroxy aromatic compound having the general formula:

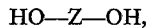

wherein Z is a divalent aromatic hydrocarbon radical of from 6–20 carbon atoms, and
    (d) phosgene, said polymer containing about 5–60 mole percent siloxane units, 10–50 mole percent imide units and 30–85 mole percent carbonate units.

2. The polymer of claim 1, wherein E is represented by the formula:

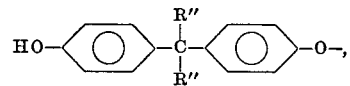

and R'' is lower alkyl or hydrogen.

3. The polymer of claim 2, wherein the dihydroxy aromatic compound is Bisphenol-A, the bis(carboxyphthalimide) is 4,4'-bis(4-carboxyphthalimido)diphenylmethane, and the organopolysiloxane is bis(carboxypropyl) tetramethylene disiloxane.

4. The polymer of claim 1, wherein E is represented by the formula:

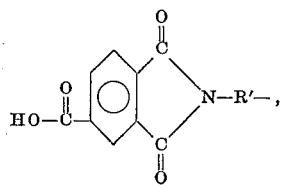

and R' is lower alkyl.

5. The polymer of claim 4, wherein the dihydroxy aromatic compound is Bisphenol-A, the bis(carboxyphthalimide) is 4,4'-bis(4-carboxyphthalimido)diphenylmethane, and the organosiloxane is a compound having the formula:

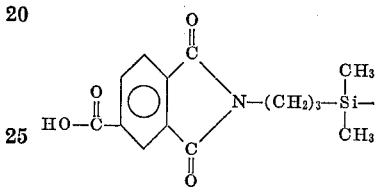

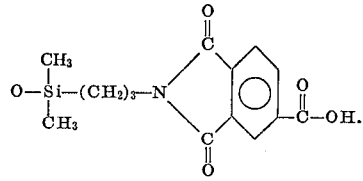

6. The polymer of claim 1, wherein E is represented by the formula:

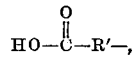

and R' is lower alkyl.

7. The polymer of claim 6, wherein the dihydroxy aromatic compound is Bisphenol-A, the bis(carboxynaphthalimide) is 4,4'-bis(4-carboxyphthalimido)diphenylmethane, and the organopolysiloxane is a compound having the formula:

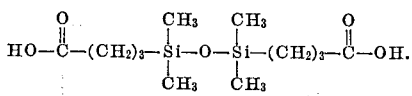

References Cited

UNITED STATES PATENTS

| | | | |
|---|---|---|---|
| 3,598,785 | 8/1971 | Holub et al. | 260—824 R |
| 2,999,845 | 9/1961 | Goldberg | 260—47 X A |
| 3,189,662 | 6/1965 | Vaughn | 260—824 R |
| 3,288,754 | 11/1966 | Green | 260—824 R |
| 3,419,635 | 12/1968 | Vaughn | 260—824 R |
| 3,553,282 | 1/1971 | Holub | 260—824 R |
| 3,632,440 | 1/1972 | Preston | 260—824 R |

WILBERT J. BRIGGS, SR., Primary Examiner

U.S. Cl. X.R.

117—161 K, 161 P, 161 ZA; 260—46.5 E, 47 XA, 78 TF, 860